United States Patent
Ohashi et al.

(10) Patent No.: US 7,618,743 B2
(45) Date of Patent: Nov. 17, 2009

(54) MICROPOROUS POLYOLEFIN FILM (75) Inventors: Masahiro Ohashi, Moriyama (JP);
Takahiko Kondo, Yokohama (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 201 days.

(21) Appl. No.: 10/551,465

(22) PCT Filed: Apr. 2, 2004

(86) PCT No.: PCT/JP2004/004849

§ 371 (c)(1),
(2), (4) Date: Aug. 21, 2006

(87) PCT Pub. No.: WO2004/089627

PCT Pub. Date: Oct. 21, 2004

(65) Prior Publication Data

US 2007/0037047 A1 Feb. 15, 2007

(30) Foreign Application Priority Data

Apr. 4, 2003 (JP) .............................. 2003-101567

(51) Int. Cl.
H01M 2/16 (2006.01)
H01M 4/58 (2006.01)

(52) U.S. Cl. .................... 429/144; 429/145; 429/231.95

(58) Field of Classification Search ................. 429/129, 429/142, 144, 145, 231.95
See application file for complete search history.

(56) References Cited

U.S. PATENT DOCUMENTS

| | | | |
|---|---|---|---|
| 5,480,745 A | | 1/1996 | Nishiyama et al. |
| 5,731,074 A | * | 3/1998 | Nishiyama et al. ....... 428/315.9 |
| 5,824,430 A | * | 10/1998 | Higuchi et al. ................ 429/62 |
| 5,856,039 A | | 1/1999 | Takahashi |

FOREIGN PATENT DOCUMENTS

| | | |
|---|---|---|
| CN | 1057873 C | 10/2000 |
| JP | 07-216118 | 8/1995 |
| JP | 2625798 | 4/1997 |
| JP | 09-259857 | 10/1997 |
| JP | 11-158304 | 6/1999 |
| JP | 11-195409 | 7/1999 |
| JP | 2000-133236 | 5/2000 |
| JP | 3352801 | 9/2002 |
| JP | 2002-321323 | 11/2002 |
| WO | WO 93/01623 | 1/1993 |

* cited by examiner

*Primary Examiner*—Patrick Ryan
*Assistant Examiner*—Thomas H. Parsons
(74) *Attorney, Agent, or Firm*—Finnegan, Henderson, Farabow, Garrett & Dunner, LLP (57) ABSTRACT

A microporous polyolefin film that comprises polyethylene and polypropylene as essential components and is composed of a laminate film of two or more layers, wherein the percentage of polypropylene blended in at least one surface layer of the film is more than 50% by weight and 95% by weight or less and the content of polyethylene in the entire film is 50% or more and 95% or less.

15 Claims, 2 Drawing Sheets

MICROPOROUS POLYOLEFIN FILM

TECHNICAL FIELD

The present invention relates to a microporous polyolefin film, in particular, to a microporous polyolefin film suitable for lithium-ion battery separators.

BACKGROUND ART

Microporous polyolefin films are now in use for microfiltration films, battery separators, condenser separators and fuel cell materials, particularly for lithium-ion battery separators.

Lithium-ion batteries have been used, in recent years, for small-size electronic devices such as cellular phones and notebook personal computers, while attempts have been made to use them for electric vehicles or mini bikes applications. Lithium-ion batteries used for the latter applications are of larger size and of higher energy capacity, so much so that they require higher safety measures. Under such circumstances, a separator for lithium-ion batteries is needed which ensures the safety of the batteries even at high temperatures possibly caused by abnormal exothermic reaction in the cells, while maintaining the battery characteristics at high temperatures.

Conventionally, microporous polyethylene films have been used for separators for lithium-ion batteries. The reason for polyethylene to be used is that polyethylene not only has an excellent permeability, but is suitable for current shutdown for securing the safety of batteries. Specifically, pores in polyethylene in communication with each other are blocked up with polymer when the polymer is fused at 130° C. to 150° C., causing current shutdown, whereby the safety of batteries is secured. The term "shutdown (or shutdown temperature)" herein used means a phenomenon (or a temperature at which the phenomenon occurs) that pores of a microporous film are blocked up with fused resin, whereby the electric resistance of the film is increased, which results in the interruption of the lithium ion flow. When using a microporous film as a battery separator, the lower the shutdown temperature, the better.

Further, a microporous film must perform another function of a battery separator; in other words, it must keep its film shape, even after its pores are blocked up with polymer, so as to maintain the insulation between the cathode and anode electrodes. Thus, the higher the short-circuit temperature, the better. The term "short-circuit temperature" herein used means a temperature at which current is restored after the separator undergoes shutdown, due to the decrease in the electric resistance of the separator caused by further increase in the temperature of the separator. In conventional polyethylene separators, however, their short-circuit temperature tends to be low since their strength rapidly lowers after the crystal fusing, which can sometimes make it hard to maintain the battery safety. Thus, improvement in film strength at high temperatures is a matter of concern.

To increase the film strength at high temperatures in polyethylene battery separators, many attempts have been made in which a microporous polyethylene film and a microporous polypropylene film are stacked together.

Patent Document 1 described later discloses a stacked film that contains polyethylene and polypropylene as essential components. In the film of this patent, the shutdown temperature is obtained by: first fixing the two sides of the porous film so that the length of the film is kept constant in the oriented direction and keeping such a state for 15 minutes; and then measuring the electric resistance of the porous film at room temperature. However, in the actual batteries, temperature increase due to the exothermic reaction occurring in an abnormal situation is very rapid. Thus, when using such a film as a battery separator, the blocking of the pores is delayed since the content of polyethylene in the entire film is 2% by weight or more and 40% by weight or less, and therefore the shutdown temperature is far from sufficiently low. Further, since the microporous film is produced by stretching pore-forming process in which uniaxial stretching is performed in the low temperature region, the film is likely to crack in the direction of orientation. Particularly in large-size lithium-ion batteries, their productivity is decreased, and thus such a film is not preferable from the practical viewpoint.

Patent Document 2 described later discloses a separator produced by stacking a porous polyolefin layer having a fusing point of 158° C. or higher and a porous polyolefin layer having a fusing point of 110° C. to 150° C. The separator of this patent attains excellent heat resistance, since the polyolefin that makes up the porous polyolefin layer having a fusing point of 158° C. or higher is any one selected from the group consisting of polypropylene, poly(4-methylpentene-1), poly (3-methylbutene-1) and the copolymers or blends thereof. However, when intending to increase the permeability of the layers, the film cannot attain sufficient strength.

Patent Document 3 described later discloses a separator produced by stacking microporous films which are formed by blending polyethylene and polypropylene. In the film, as a separator, described in the document, when intending to make it thin, each of the microporous polymer films has to be made thin, since the film, as a separator, is produced by first arranging the microporous polymer films and then heating the arranged films at temperatures lower than their fusing points. This might cause film rupture or the like frequently. Further, since the microporous polymer films are formed separately, the productivity is low and the production cost is high. Still further, since the intermediate layer is also a microporous film formed by blending polyethylene and polypropylene, the permeability is hard to improve and the shutdown temperature is far from satisfactory.

As an attempt to lower the shutdown temperature, Patent Document 4 described later discloses a microporous polyolefin film produced by stacking a microporous film containing polyethylene and polypropylene, as essential components, and a microporous polyethylene film together into an integral part. The film described in the document has a low shutdown temperature and high strength at ordinary temperature at the same time, and besides, excels in permeability. However, since the content of polypropylene in the microporous film that contains polyethylene and polypropylene as essential components is low, the short-circuit temperature and film strength at high temperatures of the film are insufficient, and moreover, the high temperature storage is poor.

Patent Document 1: JP-B-3352801
Patent Document 2: JP-B-2625798
Patent Document 3: JP-A-9-259857 (U.S. Pat. No. 5,856, 039)
Patent Document 4: JP-A-2002-321323

DISCLOSURE OF THE INVENTION

Accordingly, the object of the present invention is to provide a microporous polyolefin film that comprises polyethylene and polypropylene, as essential components, and is composed of a laminate film of two or more layers, wherein the microporous polyolefin film not only has an excellent permeability, a low shutdown temperature, a high short-circuit temperature and high film strength at high temperatures, but also excels in high temperature storage when used in batteries and safety, and thus it is suitable for a separator for lithium-ion batteries.

After directing tremendous research efforts toward microporous polyolefin films that contain polyethylene and polyolefin as essential components and are composed of a laminate film of two or more layers, the present inventors have found that the above described problems can be solved by examining the percentage of polypropylene blended in at least one surface layer of the microporous polyolefin film, the content of polyethylene in the entire film, etc. and have finally accomplished the present invention.

Specifically, the present invention relates to:

(1) a microporous polyolefin film that comprises polyethylene and polypropylene as essential components and is composed of a laminate film of two or more layers, wherein the percentage of polypropylene blended in at least one surface layer of the film is more than 50% by weight and 95% or less and the content of polyethylene in the entire film is 50% or more and 95% or less;

(2) the microporous polyolefin film according to the above described (1), wherein at least one layer of the above described laminate film is a polyethylene single layer film;

(3) the microporous polyolefin film according to the above described (1) or (2), wherein the above described laminate film is made up of three layers;

(4) the microporous polyolefin film according to the above described (1), (2) or (3), wherein each of the layers that make up the above described laminate film has a three-dimensional network;

(5) the microporous polyolefin film according to the above described (1), (2) or (3), wherein the proportion of the thickness of the layer in which the percentage of propylene blended is more than 50% by weight and 95% or less is 1.5% or more and 35% or less of the entire film thickness;

(6) the microporous polyolefin film according to the above described (1), (2) or (3), wherein the average pore diameter is 0.02 µm or more and 1 µm or less;

(7) the microporous polyolefin film according to the above described (1), (2) or (3), wherein the shutdown temperature at the time of high speed heat-up is lower than 150° C. and the short-circuit temperature at the time of high speed heat-up is 190° C. or higher;

(8) the microporous polyolefin film according to the above described (1), (2) or (3), wherein the high temperature puncture strength is 0.005 N/µm or more;

(9) a lithium-ion battery separator, comprising a microporous polyolefin film that comprises polyethylene and polypropylene as essential components and is composed of a laminate film of two or more layers, wherein the percentage of polypropylene blended in at least one surface layer of the film is more than 50% by weight and 95% or less and the content of polyethylene in the entire film is 50% or more and 95% or less;

(10) the lithium-ion battery separator according to the above described (9), wherein at least one layer of the above described laminate film is a polyethylene single layer film;

(11) the lithium-ion battery separator according to the above described (9) or (10), wherein the above described laminate film is made up of three layers;

(12) the lithium-ion battery separator according to the above described (9), (10) or (11), wherein each of the layers that make up the above described laminate film has a three-dimensional network;

(13) the lithium-ion battery separator according to the above described (9), (10) or (11), wherein the proportion of the thickness of the layer in which the percentage of propylene blended is more than 50% by weight and 95% or less is 1.5% or more and 35% or less of the entire film thickness;

(14) the lithium-ion battery separator according to the above described (9), (10) or (11), wherein the average pore diameter of the above described microporous polyolefin film is 0.02 µm or more and 1 µm or less;

(15) the lithium-ion battery separator according to the above described (9), (10) or (11), wherein the shutdown temperature at the time of high speed heat-up is lower than 150° C. and the short-circuit temperature at the time of high speed heat-up is 190° C. or higher;

(16) the lithium-ion battery separator according to the above described (9), (10) or (11), wherein the high temperature puncture strength of the above described microporous polyolefin film is 0.005 N/µm or more; and (17) a lithium-ion battery separator, including a microporous polyolefin film whose degree of blackening is 5% or less.

BEST MODE FOR CARRYING OUT THE INVENTION

In the following the microporous polyolefin film of the present invention and a process for producing the same will be described.

The present invention is a microporous polyolefin film that is composed of a laminate film of two or more layers. Preferably, the laminate film of the microporous polyolefin film is made up of three layers. From the viewpoint of productivity, more preferably the laminate film is of two-different-type three-layer structure in which the two surface layers are of the same type and the intermediate layer is of a different type. The term "laminate film" herein used means a laminate of film-like microporous films produced by laminate molding or co-extrusion molding. From the viewpoint of interlaminar strength, permeability and productivity, co-extrusion process is preferably used.

The term "at least one surface layer" herein used means, when the laminate film is made up of three layers, one of or both of the two surface layers, and when the laminate film is made up of two layers, either of the two layers.

To increase the permeability, film strength at high temperatures, high temperature storage and productivity of the microporous film, the percentage of polypropylene blended in at least one surface layer of the film needs to be more than 50% by weight and 95% by weight or less. Preferably the percentage is more than 55% by weight and 95% by weight or less and more preferably 60% by weight or more and 90% by weight or less. If the percentage of polypropylene blended is 50% by weight or less, sufficient film strength at high temperatures cannot be obtained, the short-circuit temperature at the time of high speed heat-up is drastically lowered, and the high temperature storage also deteriorates. If the percentage of polypropylene blended is more than 95% by weight, the permeability becomes low, the shutdown temperature becomes high, and film formation becomes unstable, and therefore, the productivity becomes-low. When incorporating the layer, in which more than 50% by weight and 95% by weight or less of polypropylene is blended, into a battery as a battery separator, preferably it is made opposite to the positive electrode of the battery so as to improve the high temperature storage. Thus, the percentage of polypropylene blended in at least one surface layer of the film needs to be adjusted so that it falls in the range of the above description (1).

Examples of polypropylene types used above include: homopolymer, random copolymer and block copolymer types, and either one type of polypropylene alone or two or more types of polypropylene in the form of a blend can be used. Examples of polymerization catalysts applicable include, not limited to, Ziegler-Natta catalyst and metallocene catalyst. The stereoregularity of the polypropylene types used is not limited, either. Isotactic, syndiotactic or atactic polypropylene can be used.

Examples of polyethylene types blended include: high density, intermediate density and low density types of polyethylene, and either one type of polyethylene alone or two or more types of polyethylene in the form of a blend can be used. Examples of polymerization catalysts applicable include, not limited to, Ziegler-Natta catalyst, Phillips catalyst and metallocene catalyst. From the viewpoint of extrusion molding, high density polyethylene is preferably used.

To increase the permeability and lower the shutdown temperature., the content of polyethylene in the entire film is preferably 50% by weight or more and 95% by weight or less and more preferably 60% by weight or more and 90% by weight or less.

To increase the permeability and lower the shutdown temperature, at least one of the layers making up the laminate film is preferably a polyethylene single layer film. The term "polyethylene single layer film" herein used means a microporous film in which polyolefin used is polyethylene alone. Examples of polyethylene types used in such a lamina include: high density, intermediate density and low density types of polyethylene, and either one type of polyethylene alone or two or more types of polyethylene in the form of a blend can be used. Examples of polymerization catalysts applicable include, not limited to, Ziegler-Natta catalyst, Phillips catalyst and metallocene catalyst. From the viewpoint of film strength, high density polyethylene is preferably used. Different types of polymer can also be blended, as long as the advantages of the present invention are not impaired. From the viewpoint of compatibility between film strength and high permeability, the viscosity average molecular weight of the polyethylene is preferably100000 or more and 4000000 or less and more preferably 200000 or more and 3000000 or less.

An appropriate amount of additives such as antioxidant and nucleating agent can also be added to polyethylene and polypropylene, as long as the advantages of the present invention are not impaired.

As described above, the production of a microporous film that has an excellent permeability, a low shutdown temperature, a high short-circuit temperature, high film strength at high temperatures, and besides, excels in high temperature storage when used for batteries is made possible by allowing the surface layer of the film to contain polypropylene at a high concentration and the entire film to contain an increased amount of polyethylene.

The microporous polyolefin film of the present invention is produced by: for example, melt kneading polyolefin and a plasticizer; extrusion molding the kneaded blend; stretching the molded material; extracting the plasticizer from the material, followed by heat treatment the plsticizer-free material.

Melt kneading is carried out by, for example, first using a Henschel mixer, tumbler blender or the like to blend polyolefin and then using a single- or twin-screw extruder. Preferably, the melt kneading is performed at 160° C. or higher and 300° C. or lower. Melt kneading of polyolefin and a plasticizer may be carried out by blending raw material polymer and a plasticizer in a Henschel mixer or the like as described above and feeding the blend to the hopper of an extruder in the slurry state or in the molten state. Or the melt kneading may be carried out by first feeding raw material polymer alone to the hopper of an extruder at the time of melt kneading and then feeding a plasticizer to an extruder in the course of extrusion.

The plasticizer used is preferably an organic compound that is compatible with polyethylene and polypropylene at temperatures higher than its fusing point when blended with such polyethylene and polypropylene. Examples of such plasticizers include: hydrocarbons such as liquid paraffin and paraffin wax; and phthalic esters such as dioctyl phthalate and diheptyl phthalate. Preferably, the plasticizer melt kneaded accounts for 20% by weight or more and 80% by weight or less of the entire blend.

The extrusion molding is carried out by the process in which molded material is extruded from a sheet die, such as slit die or T die, and cooled with a casting roll etc. or by the inflation process, so as to obtain a gel sheet. The laminate film can be produced from gel sheets that constitute layers of the laminate film either by the co-extrusion process in which gel sheets extruded from the respective extruders are integrated into a single sheet and extruded from a die or by the process in which gel sheets extruded separately are superimposed and heat fused. Of these processes, the co-extrusion process is preferable, because the process makes it easy to achieve high interlaminar strength and form communication pores between laminae, thereby making it easy to maintain high permeability, and besides it has an excellent productivity.

Examples of stretching methods include: uniaxial stretching, simultaneous biaxial stretching and sequential biaxial stretching, and of these methods, simultaneous biaxial stretching and sequential biaxial stretching are preferable. The stretching temperature is preferably 100° C. or higher and 135° C. or lower. The stretching ratio is preferably 3-fold or higher and 200-fold or lower on the area basis from the viewpoint of film strength.

Extraction of the plasticizer is carried out by immersing the film in an extraction solvent. After that, the film is fully dried. Preferably, the extraction solvent used is a poor solvent to polyethylene and polypropylene, and at the same time, a good solvent to the plasticizer, and besides, it has a boiling point lower than those of polyethylene and polypropylene. Examples of such extraction solvents include: chlorine solvent such as methylene chloride; ketones such as methyl ethyl ketone and acetone; halogen organic solvents such as hydrofluorocarbon, hydrofluoroether, cyclic hydrofluorocarbon, perfluorocarbon and perfluoroether; ethers such as diethyl ether; low boiling hydrocarbons such as hexane; and alcohols such as methanol and isopropyl alcohol. Of these extraction solvents, methylene chloride is particularly preferable. The film may undergo stretching after the extraction, depending on the situation, so as to adjust film thickness or air permeability. Examples of stretching methods employed after the extraction include: uniaxial stretching, simultaneous biaxial stretching and sequential biaxial stretching, and of these methods, simultaneous biaxial stretching and sequential biaxial stretching are preferable. The stretching temperature is preferably 100° C. or higher and 135° C. or lower. The draw ratio is preferably higher than 1-fold and 10-fold or lower on the area basis.

Heat treatment is performed by, for example, relaxing the shrinkage stress using a tenter in the temperature range of 100° C. or higher to the melting point of polyethylene in order to reduce the shrinkage of a film (or membrane) under a high-temperature atmosphere.

In the microporous polyolefin film produced as above, preferably each of the layers that make up the film has a three-dimensional network where pores are three-dimensionally complicated with one another. And preferably such three-dimensional networks are connected to each other among the layers. The term "three-dimensional network" herein used means a structure whose surface seems like the veins of a leaf and whose sections: longitudinal, cross and vertical sections seem like a sponge. The term "vein-like" herein used means a state in which fibrils form a network. These are confirmed by the observation of the surface and sections of the film with a scanning electron microscope. The diameter of the fibrils that form a three-dimensional network is preferably 0.01 μm or more and 0.3 μm or less, which can be observed with a scanning electron microscope.

The microporous polyolefin film of the present invention is characterized as follows.

(1) The thickness of the entire film is 5 μm or more and 60 μm or less, preferably 7 μm or more and 50 μm or less, more preferably 10 μm or more and 25 μm or less and most preferably 10 μm or more and 20 μm or less. From the viewpoint of preventing insulation failure of batteries, the thickness is preferably 5 μm or more and from the viewpoint of ensuring the battery capacity, the thickness is preferably 60 μm or less.

(2) The proportion of the thickness of the layer in which the percentage of propylene blended is more than 50% by weight and 95% or less is 1.5% or more and 35% or less of the entire film thickness, preferably 5% or more and 20% or less and more preferably 5% or more and 10% or less. From the viewpoint of maintaining the film shape at high temperatures, the proportion is preferably 1.5% or more and from the viewpoint of permeability, it is preferably 35% or less.

(3) The porosity is more than 20% and less than 80% and preferably more than 30% and less than 50%. From the viewpoint of permeability, the porosity is preferably more than 20% and from the viewpoint of mechanical strength, it is preferably less than 80%.

(4) The air permeability is 50 sec/100 ml/20 μm or more and 1000 sec/100 ml/20 μm or less and preferably 200 sec/100 ml/20 μm or more and 800 sec/100 ml/20 μm or less. From the viewpoint of mechanical strength, the air permeability is preferably 50 sec/100 ml/20 μm or more and from the viewpoint of cycle characteristics and rate characteristics of batteries, it is preferably 1000 sec/100 ml/20 μm or less.

(5) The average pore diameter is 0.02 μm or more and 1 μm or less and preferably 0.03 μm or more and 0.1 μm or less. From the viewpoint of ionic permeability, the average pore diameter is preferably 0.02 μm or more and from the viewpoint of film strength and heat resistance, it is preferably 1 μm or less.

(6) The shutdown temperature at the time of high speed heat-up is lower than 150° C. and preferably lower than 140° C.

The short-circuit temperature at the time of high speed heat-up is 190° C. or higher and preferably 195° C. or higher.

(7) The high temperature puncture strength is 0.005 N/μm or higher. If the high temperature puncture strength is lower than 0.005 N/μm, the film shape tends to be not maintained at high temperatures.

(8) The high temperature storage is 70% or more. If the high temperature storage is less than 70%, the battery performance at high temperatures is decreased. The high temperature storage of a battery is obtained from the capacity retention ratio after the battery is stored at 60° C. for 7 days.

(9) The degree of blackening is preferably 5% or less per unit area and preferably 3% or less, from the viewpoint of high temperature storage. The degree of blackening is obtained by observing the surface of a separator after the separator is stored at 4.2 V, 85° C. for 7 days and calculating the ratio of the blackened portion.

The microporous polyethylene film of the present invention has an excellent permeability, a low shutdown temperature, a high short-circuit temperature, high film strength at high temperatures, and besides, excels in high temperature storage when incorporated in batteries as a battery separator. In separators of comparative examples described later, which were inferior in high temperature storage, a number of blackened portions were observed after conducting various tests on the side in contact with the positive electrode, possibly because some reaction occurred in them. In contrast, in separators which were superior in high temperature storage, blackened portions were hardly observed on the side in contact with the positive electrode.

In the following the present invention will be described in further detail by examples; however, it is to be understood that these examples are not intended to limit the present invention. The test methods shown in such examples are as follows.

(1) Content of Polyethylene (%)

The polyethylene-polypropylene mixing ratio of each layer was calculated from the extruder output for each layer.

(2) Thickness of the Entire Film (μm)

Measurement was made using a dial gage (OZAKI MFG. CO., LTD.: "PEACOCK No. 25" (trademark)).

(3) The Percentage of the Film Thickness of the Layer in which the Percentage of Polypropylene Blended is More than 50% by Weight and 95% or Less (%)

Thickness measurement was made by observing the sections of films with a scanning electron microscope or by peeling the layer, when the layer could be peeled off. The percentage was calculated using the measured thickness of the layer and that of the entire film.

(4) Porosity

20×20 cm square samples were collected, and the volume and mass of the samples were measured. Then the porosity was calculated from the following equation using the measured values.

Porosity(%)=(Volume(cm$^3$)−Mass (g)/Density of polymer composition)/Volume(cm$^3$)×100

(5) Air Permeability

Measurement was made with a Gurley air permeability tester ("G-B2" (trademark) manufactured by Toyo Seiki Seisaku-Sho, Ltd.) in accordance with JIS P-8117.

(6) Average Pore Diameter (μm)

It is known that fluid inside a capillary follows the Knudsen flow when the mean free path of the fluid is larger than the pore diameter of the capillary, whereas it follows the Poiseuille flow when its mean free path is smaller than the pore diameter of the capillary. So then, it is assumed that air flow in the measurement of air permeability of microporous films follows the Knudsen flow and water flow in the measurement of water permeability of microporous films follows the Poiseuille flow. In this case, the pore diameter d(μm) can be obtained from the following equation using the permeation rate constant of air $R_{gas}(m^3/(m^2 \cdot sec \cdot Pa))$, the permeation rate constant of water $R_{liq}(m^3/(m^2 \cdot sec \cdot Pa))$, the molecular speed of air v(m/sec), the viscosity of water η(Pa·sec), the standard pressure Ps(=101325 Pa), the porosity ϵ(%) and the film thickness L(μm):

$$d = 2v \times (R_{liq}/R_{gas}) \times (16\eta/3Ps) \times 10^6$$

In the above equation, $R_{gas}$ is obtained from air permeability (sec) by the following equation:

$$R_{gas} = 0.0001/(\text{air permeability} \times (6.424 \times 10^{-4}) \times (0.01276 \times 101325))$$

and $R_{liq}$ is obtained from the following equation using water permeability $(cm^3/(cm^2 \cdot sec \cdot Pa))$ $$R_{liq} = \text{water permeability}/100$$

The water permeability can be obtained as follows. A microporous film having been immersed in alcohol in advance is set in a stainless water-permeability cell 41 mm in diameter, the alcohol in the film was washed away with water, the film is permeated with water at a differential pressure of about 50000 Pa, and the amount of water having permeated ($cm^3$) after 120 seconds have elapsed is measured. The amount of water having permeated per unit time-unit pressure-unit area is calculated using the above measured amount, and the calculated value is used as the water-permeability.

(7) Pore Diameter Distribution (μm)

Measurement was made for the layers that could be peeled off by the mercury porosimetry ("SHIMADZU AutoPore 9220" (trade mark) manufactured by SHIMADZU Corporation). About 25×25 mm square samples were cut, each of the samples was taken in a standard cell, and the pore diameter was measured under initial pressure of about 20 kPa.

(8) Shutdown Temperature, Short-Circuit Temperature At the Time of High Speed Heat-Up (° C.)

Figure 1:
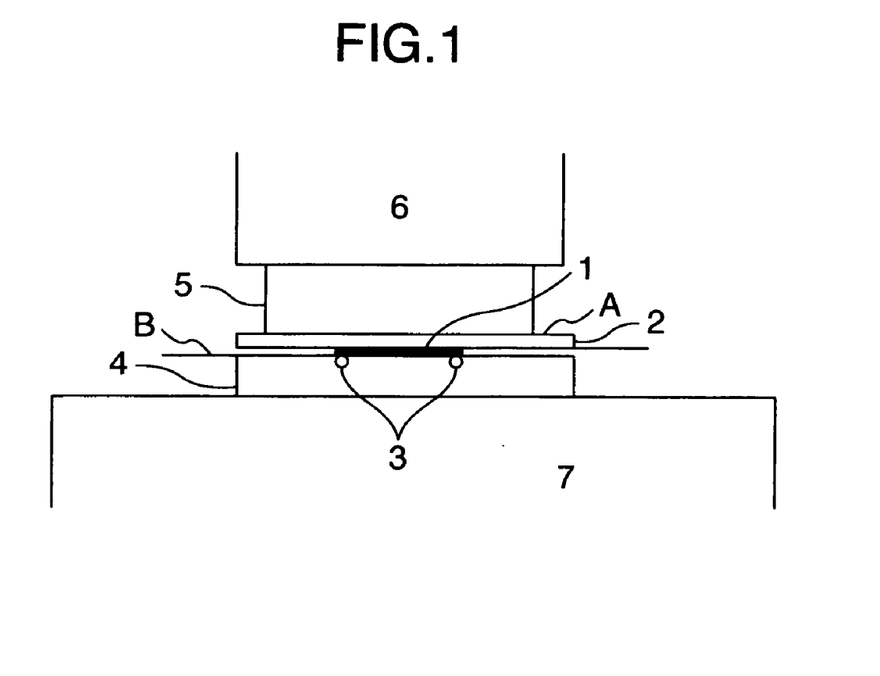
FIG. 1 is a schematic view showing a measuring device for measuring the shutdown temperature at the time of high speed heat-up.
Figure 2:
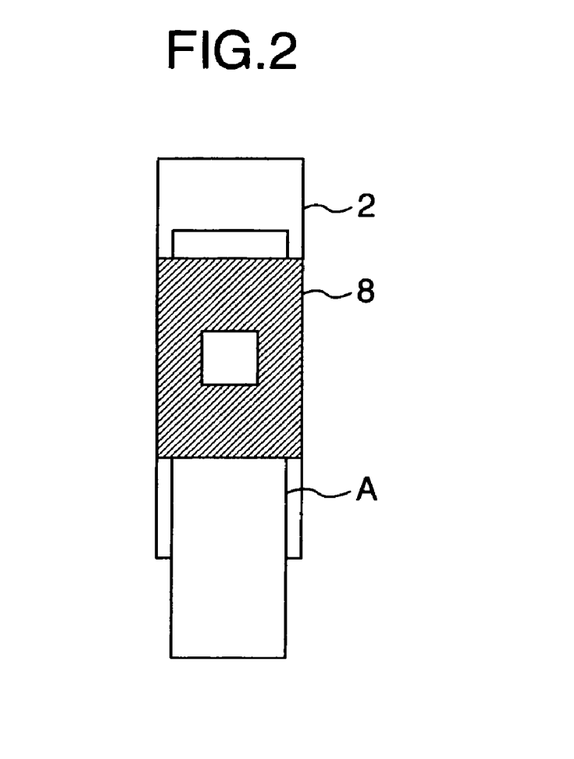
FIG. 2 is a plan view of nickel foil A with its surface masked with Teflon tape which is used for measuring the shutdown temperature and short-circuit temperature at the time of high speed heat-up.

A schematic view of a measuring device for measuring the shutdown temperature and short-circuit temperature at the time of high speed heat-up is shown in FIG. 1. Two sheets of nickel foil 10 μm thick (A, B) were prepared, and one of them (nickel foil A) was fixed on a slide glass 2 with its surface masked with "Teflon" (registered trademark) tape 8 (the shaded portion of FIG. 2) leaving 10 mm×10 mm square portion unmasked (FIG. 2). As an electrolyte, 1 mol/liter of lithium borofluoride solution (solvent:propylenecarbonate/ethylenecarbonate/γ-butyl lactone=1/1/2) was used. The other (nickel foil B) was put on a ceramic plate 4 to which a thermo couple 3 was connected, a microporous film 1 as a sample to be measured, which had been immersed in the above described electrolyte for 3 hours, was put on the nickel foil B, the slide glass with the nickel foil A stacked thereon was put on the microporous film, and silicon rubber 5 was put on the slide glass. The ceramic plate with the nickel foil B, the film 1, the slide glass and the silicon rubber was set on a hot plate 7 and heated from 25° C. up to 200° C. at a heat-up rate of 15° C./min while undergoing a pressure of 1.5 MPa by an oil hydraulic pressing machine 6. The change of impedance during this operation was measured with a LCR meter under an alternating voltage of 1 V and frequency of 1 kHz. In this measurement, the temperature at which the impedance reached 1000 Ω was taken as the shutdown temperature. And the temperature at which the impedance became lower than 1000 Ω again after the pores of the film were brought to the blocked state was taken as the short-circuit temperature.

(9) High Temperature Puncture Strength (N/μm)

A microporous film was sandwiched between two stainless washers having an internal diameter of 13 mm and an external diameter of 25 mm, and they were fastened with three clips on their periphery and immersed in silicon oil (KF-96-10CS manufactured by Shin-Etsu Chemical Co., Ltd.) at 160° C. After one minute, the puncture strength test was carried out using a handy compression tester "KES-G5" (trademark) manufactured by KATO TECH CO. LTD. under the conditions: probe's tip curvature radius of 0.5 mm and puncture speed of 2 mm/sec. The maximum puncture load (N) was measured. The product obtained by multiplying the measured value by 1/film thickness (μm) was taken as the high temperature puncture strength (N/μm).

(10) High Temperature Storage (%)

(a) Preparation of Positive Electrode

A slurry was prepared by dispersing in N-methylpyrrolidone (NMP) 92.2% by weight of lithium cobalt composite oxide $LiCoO_2$ as an active material, 2.3% by weight of flake graphite and of acetylene black as conductive materials, and 3.2% by weight of polyvinylidene fluoride (PVdF) as a binder. The slurry was coated on one side of aluminium foil 20 μm thick, which was to be a positive electrode current collector, with a die coater, dried at 130° C. for 3 minutes, and compression molded with a roll pressing machine. The coating was performed so that the amount of the positive electrode active material coated was 250 $g/m^2$ and the bulk density of the active material was 3.00 $g/cm^3$. The resultant positive electrode was punched to obtain a circular electrode having an area of 2.00 $cm^2$.

(b) Preparation of Negative Electrode

A slurry was prepared by dispersing in purified water 96.9% by weight of synthetic graphite as an active material and 1.4% by weight of ammonium salt of carboxymethylcellulose and 1.7% by weight of styrene-butadiene copolymer latex as binders. The slurry was coated on one side of copper foil 12 μm thick, which was to be a negative electrode current collector, with a die coater, dried at 120° C. for 3 minutes, and compression molded with a roll pressing machine. The coating was performed so that the amount of the negative electrode active material coated was 106 $g/m^2$ and the bulk density of the active material was 1.35 $g/cm^3$. The resultant negative electrode was punched to obtain a circular electrode having an area of 2.05 $cm^2$.

(c) Assembly of Simple Battery

The above described microporous polyolefin film, circular positive electrode and circular negative electrode and an electrolyte were incorporated into an aluminum or stainless cell to produce a simple lithium-ion battery.

(d) Evaluation of High Temperature Storage

The simple battery assembled as above was initially charged at a current of 3 mA (about 0.5 C) to a battery voltage of 4.2 V in the atmosphere at 25° C. and continued to be charged for totaling 6 hours in such a manner as to throttle the current flow from 3 mA while keeping the battery voltage at 4.2 V. Then, the battery was discharged at a current of 3 mA to a battery voltage of 3.0 V.

Then, the battery was charged at a current of 6 mA (about 1.0 C) to a battery voltage of 4.2 V in the atmosphere at 25° C.

and continued to be charged for totaling 3 hours in such a manner as to throttle the current flow from 6 mA while keeping the battery voltage at 4.2 V. Then, the battery was discharged at a current of 6 mA to a battery voltage of 3.0 V. The discharge capacity at this point was represented by A (mAh).

Then, the battery was charged at a current of 6 mA (about 1.0 C) to a battery voltage of 4.2 V in the atmosphere at 25° C. and continued to be charged for totaling 3 hours in such a manner as to throttle the current flow from 6 mA while keeping the battery voltage at 4.2 V. The cell kept in the charged state was stored in the atmosphere at 60° C. for 7 days. After the storing, the cell was taken out and discharged at a current of 6 mA to a battery voltage of 3.0 V in the atmosphere at 25° C. Then, the cell was charged at a current of 6 mA (about 1.0 C) to a battery voltage of 4.2 V in the atmosphere at 25° C. and continued to be charged for totaling 3 hours in such a manner as to throttle the current flow from 6 mA while keeping the battery voltage at 4.2 V. The cell was then discharged at a current of 6 mA to a battery voltage of 3.0 V. The discharge capacity at this point was represented by B (mAh). The capacity maintaining rate was obtained from the ratio of B to A and the ratio was taken as the high temperature storage.

(11) Degree of Blackening (%)

A simple lithium-ion battery was produced in the same manner as in the above description (10). The battery was initially charged at a current of 3 mA (about 0.5 C) to a battery voltage of 4.2 V in the atmosphere at 25° C. and continued to be charged for totaling 6 hours in such a manner as to throttle the current flow from 3 mA while keeping the battery voltage at 4.2 V. Then, the battery was discharged at a current of 3 mA to a battery voltage of 3.0 V. Then, the battery was charged at a current of 6 mA (about 1.0 C) to a battery voltage of 4.2 V in the atmosphere at 25° C. and continued to be charged for totaling 3 hours in such a manner as to throttle the current flow from 6 mA while keeping the battery voltage at 4.2 V. Then, the battery was discharged at a current of 6 mA to a battery voltage of 3.0 V.

Then, the battery was charged at a current of 6 mA (about 1.0 C) to a battery voltage of 4.2 V in the atmosphere at 25° C. and continued to be charged for totaling 3 hours in such a manner as to throttle the current flow from 6 mA while keeping the battery voltage at 4.2 V. The battery was stored in the atmosphere at 85° C. for 7 days while continuing charging so that the battery voltage was kept at 4.2 V. After that, the cell was taken out and discharged at a current of 6 mA to a battery voltage of 3.0 V in the atmosphere at 25° C.

The separator was taken out from the battery and subjected to ultrasonic cleaning in dimethoxyethane, in ethanol, in 1N hydrochloric acid and in water for 15 minutes for each to remove deposits. Then, the separator was dried in the air, one side of the separator which was in contact with the positive electrode was observed with an optical microscope, and the micrograph was subjected to imaging. The percentage of the blackened portion in the obtained image was calculated to obtain the degree of blackening.

In the following the present invention will be described by examples.

EXAMPLE 1

A microporous polyolefin film of 3-layer laminate film structure was produced in which the two surface layers were composed of 60 parts by weight of polypropylene (with a density of 0.90 and a viscosity average molecular weight of 300000), as homopolymer, and 40 parts by weight of high density polyethylene(with a density of 0.95 and a viscosity average molecular weight of 250000) and the intermediate layer was composed of 100 parts by weight of high density polyethylene (with a density of 0.95 and a viscosity average molecular weight of 250000). As an antioxidant, 0.3 parts by weight of tetrakis-(methylene-3-(3',5'-di-t-butyl-4'-hydroxyphenyl)propionate)methane was blended with the composition of each layer. Further, 3 parts by weight of bis(p-ethyelbenzylidene)sorbitol was blended with the composition of the two surface layers. The compositions were fed into the respective twin-screw extruders having a bore diameter of 25 mm and a L/D=48 through a feeder. Then, 150 parts by weight of liquid paraffin (with a kinetic viscosity at 37.78° C. of 75.90 cSt) was poured into the respective extruders with a side feed, each of the mixture was kneaded at 200° C. and 200 rpm, and the kneaded material was extruded from a co-extrudable T die fixed at the tip of the extruder and immediately cooled and solidified with a casting roll having been cooled to 25° C. to mold a sheet 1.5 mm thick. The sheet was stretched to 7-×7-fold size with a simultaneous biaxial stretching machine at 124° C. The stretched film was then immersed in methylene chloride to extract and remove the liquid paraffin, dried, and heat treated at 120° C. to obtain a microporous film. The physical properties of the resultant microporous film are shown in Table 1. The degree of blackening is shown in Table 3.

EXAMPLE 2

Figure 3:
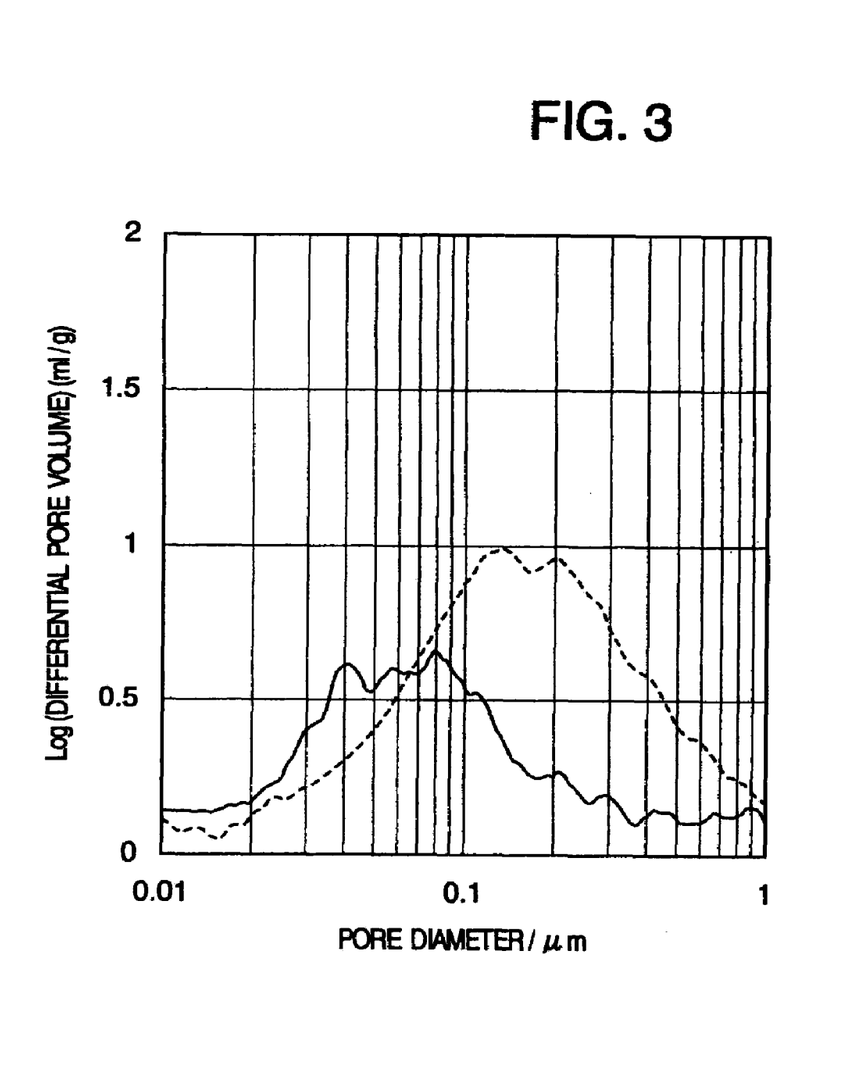
FIG. 3 is a graph showing the results of pore diameter distribution measurements in example 2. The solid line represents the surface layer and the dotted line represents the intermediate layer.

A microporous film was produced in the same manner as in Example 1, provided that the two surface layers were composed of 80 parts by weight of polypropylene (with a density of 0.90 and a viscosity average molecular weight of 300000), as homopolymer, and 20 parts by weight of high density polyethylene(with a density of 0.95 and a viscosity average molecular weight of 250000). The physical properties of the resultant microporous film are shown in Table 1. The results of examining the degree of blackening are shown in Table 3. And the measurements of the pore diameter of each layer are shown in FIG. 3.

EXAMPLE 3

A microporous film was produced in the same manner as in Example 2, provided that the thickness of the molded sheet was 0.9 mm. The physical properties of the resultant microporous film are shown in Table 1.

EXAMPLE 4

A microporous film was produced in the same manner as in Example 2, provided that the thickness of the molded sheet was 3.0 mm. The physical properties of the resultant microporous film are shown in Table 1.

EXAMPLE 5

A microporous film was produced in the same manner as in Example 2, provided that the two surface layers were composed of 80 parts by weight of polypropylene (with a density of 0.90 and a viscosity average molecular weight of 300000), as homopolymer, and 20 parts by weight of high density polyethylene (with a density of 0.95 and a viscosity average molecular weight of 600000), the extruder output of the intermediate layer was increased so that the content of polyethylene in the entire film was increased, the stretching was performed at 122° C., and heat treatment was performed at 127° C. The physical properties of the resultant microporous film are shown in Table 1.

EXAMPLE 6

A microporous film was produced in the same manner as in Example 5, provided that the thickness of the molded sheet was 0.35 mm, the extruded sheet was stretched to 4-fold width at 115° C., and the stretched film was immersed in methylene chloride to extract and remove the liquid, dried, stretched again to 2-fold length at 115° C. and then 2-fold width at 130° C. The physical properties of the resultant microporous film are shown in Table 1.

EXAMPLE 7

A microporous film was produced in the same manner as in Example 5, provided that the two surface layers were composed of 80 parts by weight of polypropylene (with a density of 0.90 and a viscosity average molecular weight of 200000), as random copolymer, and 20 parts by weight of high density polyethylene (with a density of 0.95 and a viscosity average molecular weight of 600000). The physical properties of the resultant microporous film are shown in Table 1.

EXAMPLE 8

A microporous film was produced in the same manner as in Example 5, provided that the thickness of the molded sheet was 0.7 mm and the intermediate layer was composed of high density polyethylene (with a density of 0.95 and a viscosity average molecular weight of 600000). The physical properties of the resultant microporous film are shown in Table 1.

EXAMPLE 9

A microporous film of 2-layer laminate film structure was produced by changing the shape of T die used. One of the two layers was composed of 80 parts by weight of polypropylene (with a density of 0.90 and a viscosity average molecular weight of 300000), as homopolymer, and 20 parts by weight of high density polyethylene (with a density of 0.95 and a viscosity average molecular weight of 600000). The other layer was composed of 25 parts by weight of ultra high molecular weight polyethylene (with a density of 0.94 and a viscosity average molecular weight of 2000000), 15 parts by weight of high density polyethylene (with a density of 0.95 and a viscosity average molecular weight of 600000), 30 parts by weight of high density polyethylene (with a density of 0.95 and a viscosity average molecular weight of 250000) and 30 parts by weight of high density polyethylene (with a density of 0.95 and a viscosity average molecular weight of 150000). As an antioxidant, 0.3 parts by weight of tetrakis-(methylene-3-(3',5'-di-t-butyl-4'-hydroxyphenyl)propionate)methane was blended with the composition of each layer. Further, 3 parts by weight of bis(p-ethyelbenzylidene)sorbitol was blended with the composition with polypropylene blended therein. The compositions were fed into the respective twin-screw extruders having a bore diameter of 25 mm and a L/D=48 through a feeder. Then, 150 parts by weight of liquid paraffin (with a kinetic viscosity at 37.78° C. of 75.90 cSt) was poured into the extruders with a side feed, each of the mixture was kneaded at 200° C. and 200 rpm, and the kneaded material was extruded from a co-extrudable T die fixed at the tip of the extruder and immediately cooled and solidified with a casting roll having been cooled to 25° C. to mold a sheet 1.5 mm thick. The sheet was stretched to 7-×7-fold size with a simultaneous biaxial stretching machine at 122° C. And the stretched film was immersed in methylene chloride to extract and remove the liquid paraffin, dried, and heat treated at 127° C. to obtain a microporous film. The physical properties of the resultant microporous film are shown in Table 2.

COMPARATIVE EXAMPLE 1

A microporous film was produced in the same manner as in Example 1, provided that the two surface layers were composed of 20 parts by weight of polypropylene (with a density of 0.90 and a viscosity average molecular weight of 300000), as homopolymer, and 80 parts by weight of high density polyethylene (with a density of 0.95 and a viscosity average molecular weight of 250000). The physical properties of the resultant microporous film are shown in Table 2. The resultant microporous film did not have sufficient high temperature puncture strength and high temperature storage. The measurement of the degree of blackening is shown in Table 3, which indicates that the degree of blackening is more than 5%.

COMPARATIVE EXAMPLE 2

A microporous film was produced in the same manner as in Example 1, provided that the two surface layers were composed of 40 parts by weight of polypropylene (with a density of 0.90 and a viscosity average molecular weight of 300000), as homopolymer, and 60 parts by weight of high density polyethylene (with a density of 0.95 and a viscosity average molecular weight of 250000). The physical properties of the resultant microporous film are shown in Table 2. The resultant microporous film did not have sufficient high temperature puncture strength and high temperature storage. The measurement of the degree of blackening is shown in Table 3, which indicates that the degree of blackening is more than 5%.

COMPARATIVE EXAMPLE 3

A microporous film was produced in the same manner as in Example 1, provided that the two surface layers were composed of 80 parts by weight of polypropylene (with a density of 0.90 and a viscosity average molecular weight of 300000), as homopolymer, and 20 parts by weight of high density polyethylene (with a density of 0.95 and a viscosity average molecular weight of 250000), and the extruder output of the surface layers was increased, while decreasing the extruder output of the intermediate layer, to decrease the content of polyethylene. The physical properties of the resultant microporous film are shown in Table 2. The resultant microporous film did not have sufficient permeability and its shutdown temperature was increased.

COMPARATIVE EXAMPLE 4

A microporous film was produced in the same manner as in Example 1, provided that the two surface layers were composed of 100 parts by weight of polypropylene (with a density of 0.90 and a viscosity average molecular weight of 300000), as homopolymer. The physical properties of the resultant microporous film are shown in Table 2. The resultant microporous film did not have sufficient permeability and its shutdown temperature was increased.

COMPARATIVE EXAMPLE 5

A microporous film was produced in the same manner as in Example 1, provided that the two surface layers were composed of 100 parts by weight of polyethylene (with a density of 0.95 and a viscosity average molecular weight of 250000). The physical properties of the resultant microporous film are shown in Table 3. The resultant microporous film ruptured at high temperature puncture and did not have sufficient high temperature storage. The measurement of the degree of blackening is shown in Table 3, which indicates that the degree of blackening is much more than 5%.

TABLE 1

|  | Surface layer composition | Percentage of PE (%) | Percentage of PP/PE layer thickness (%) | Thickness of entire film (μm) | Air permeability (sec/100 ml/20 μm) | Average pore diameter (μm) | Shutdown temperature at the time of high speed heat-up (° C.) | Short-circuit temperature at the time of high speed heat-up (° C.) | High temperature puncture strength (N/μm) | High temperature storage (%) |
|---|---|---|---|---|---|---|---|---|---|---|
| Example 1 | PP/PE = 60/40 | 76 | 33 | 18 | 534 | 0.04 | 147 | 195 | 0.007 | 72.0 |
| Example 2 | PP/PE = 80/20 | 68 | 32 | 19 | 607 | 0.03 | 148 | 200 | 0.010 | 73.7 |
| Example 3 | PP/PE = 80/20 | 68 | 33 | 12 | 597 | 0.03 | 148 | 200 | 0.009 | 73.4 |
| Example 4 | PP/PE = 80/20 | 68 | 33 | 39 | 612 | 0.03 | 148 | 200 | 0.010 | 73.8 |
| Example 5 | PP/PE = 80/20 | 84 | 21 | 19 | 354 | 0.04 | 148 | 200 | 0.010 | 74.1 |
| Example 6 | PP/PE = 80/20 | 84 | 21 | 19 | 95 | 0.07 | 149 | 200 | — | — |
| Example 7 | PP/PE = 80/20 | 84 | 20 | 20 | 659 | 0.03 | 142 | 190 | — | — |
| Example 8 | PP/PE = 80/20 | 84 | 22 | 9 | 411 | 0.03 | 149 | 200 | — | — |

TABLE 2

|  | Surface layer composition | Percentage of PE (%) | Percentage of PP/PE layer thickness (%) | Thickness of entire film (μm) | Air permeability (sec/100 ml/20 μm) | Average pore diameter (μm) | Shutdown temperature at the time of high speed heat-up (° C.) | Short-circuit temperature at the time of high speed heat-up (° C.) | High temperature puncture strength (N/μm) | High temperature storage (%) |
|---|---|---|---|---|---|---|---|---|---|---|
| Example 9 | PP/PE = 80/20 PE = 100 | 84 | 20 | 20 | 315 | 0.04 | 148 | 190 | — | — |
| Comparative Example 1 | PP/PE = 20/80 | 92 | 32 | 19 | 467 | 0.05 | 145 | 175 | 0.003 | 68.2 |
| Comparative Example 2 | PP/PE = 40/60 | 84 | 32 | 19 | 494 | 0.04 | 146 | 180 | 0.004 | 69.5 |
| Comparative Example 3 | PP/PE = 80/20 | 40 | 74 | 19 | 1053 | 0.03 | 151 | 200 | 0.011 | 73.9 |
| Comparative Example 4 | PP = 100 | 60 | 33 | 20 | 1165 | 0.03 | 153 | 200 | 0.013 | 74.4 |
| Comparative Example 5 | PE = 100 | 100 |  | 18 | 348 | 0.05 | 144 | 150 | Membrne rupture occurred. | 66.8 |

TABLE 3

|  | Surface layer composition | Degree of blackening (%) |
|---|---|---|
| Example 1 | PP/PE = 60/40 | 2.6 |
| Example 2 | PP/PE = 80/20 | 1.2 |
| Comparative Example 1 | PP/PE = 20/80 | 13.4 |
| Comparative Example 2 | PP/PE = 40/60 | 7.3 |
| Comparative Example 5 | PE = 100 | 35.0 |

INDUSTRIAL APPLICABILITY

The microporous film of the present invention has an excellent permeability, a low shutdown temperature, a high short-circuit temperature, high film strength at high temperatures, and besides, excels in high temperature storage when used in batteries, and thus it is suitable for a lithium-ion battery separator.

The invention claimed is:

1. A microporous polyolefin film that comprises polyethylene and polypropylene as essential components and is composed of a laminate film of three layers, wherein the percentage of polypropylene blended in at least one surface layer of the film is more than 50% by weight and 95% or less, the intermediate layer is a polyethylene single layer film and the content of polyethylene in the entire film is 50% or more and 95% or less.

2. The microporous polyolefin film according to claim 1, wherein each of the layers that make up the laminate film has a three-dimensional network.

3. The microporous polyolefin film according to claim 1, wherein the proportion of the thickness of the layer in which the percentage of propylene blended is more than 50% by weight and 95% or less is 1.5% or more and 35% or less of the entire film thickness.

4. The microporous polyolefin film according to claim 1, wherein the average pore diameter is 0.02 μm or more and 1 μm or less.

5. The microporous polyolefin film according to claim 1, wherein the shutdown temperature at the time of high speed heat-up is lower than 150° C. and the short-circuit temperature at the time of high speed heat-up is 190° C. or higher.

6. The microporous polyolefin film according to claim 1, wherein the high temperature puncture strength is 0.005 N/μm or more.

7. A microporous polyolefin film according to claim 1 wherein both surface layers of the film contain more than 50% by weight and 95% by weight or less polypropylene.

8. A lithium-ion battery separator, comprising a microporous polyolefin film that comprises polyethylene and polypropylene as essential components and is composed of a laminate film of three layers, wherein the percentage of polypropylene blended in at least one surface layer of the film is more than 50% by weight and 95% or less, the intermediate layer is a polyethylene single layer film and the content of polyethylene in the entire film is 50% or more and 95% or less.

9. The lithium-ion battery separator according to claim 8, wherein each of the layers that make up the laminate film has a three-dimensional network.

10. The lithium-ion battery separator according to claim 8, wherein the proportion of the thickness of the layer in which the percentage of propylene blended is more than 50% by weight and 95% or less is 1.5% or more and 35% or less of the entire film thickness.

11. The lithium-ion battery separator according to claim 8, wherein the average pore diameter of the microporous polyolefin film is 0.02 µm or more and 1 µm or less.

12. The lithium-ion battery separator according to claim 8, wherein the shutdown temperature at the time of high speed heat-up is lower than 150° C. and the short-circuit temperature at the time of high speed heat-up is 190° C. or higher.

13. The lithium-ion battery separator according to claim 8, wherein the high temperature puncture strength of the microporous polyolefin film is 0.005 N/µm or more.

14. A lithium-ion battery separator according to claim 8 wherein both surface layers of the film contain more than 50% by weight and 95% by weight or less polypropylene.

15. A lithium-ion battery separator, comprising a microporous polyolefin film whose degree of blackening is 5% or less.

* * * * *